(12) United States Patent
Liao et al.

(10) Patent No.: US 12,519,193 B2
(45) Date of Patent: Jan. 6, 2026

(54) LIQUID INJECTION DEVICE AND PRODUCTION LINE

(71) Applicant: CONTEMPORARY AMPEREX TECHNOLOGY CO., LIMITED, Ningde (CN)

(72) Inventors: Hongyan Liao, Ningde (CN); Feng Guan, Ningde (CN); Chen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/240,710

(22) Filed: Jun. 17, 2025

(65) Prior Publication Data

US 2025/0316867 A1 Oct. 9, 2025

Related U.S. Application Data

(63) Continuation of application No. PCT/CN2024/113740, filed on Aug. 21, 2024.

(30) Foreign Application Priority Data

Jan. 15, 2024 (CN) .......................... 202420096151.0

(51) Int. Cl.
*H01M 8/04276* (2016.01)
*H01M 50/609* (2021.01)

(52) U.S. Cl.
CPC ................................ *H01M 50/609* (2021.01)

(58) Field of Classification Search
CPC ............................................ H01M 50/60–691
See application file for complete search history.

(56) References Cited

U.S. PATENT DOCUMENTS 2,274,118 A * 2/1942 Altmayer ............ H01M 50/627
141/285
2,732,985 A * 1/1956 Howard .............. H01M 50/609
141/285

(Continued)

FOREIGN PATENT DOCUMENTS

CN 106784591 A 5/2017
CN 206179977 U 5/2017

(Continued)

OTHER PUBLICATIONS

Machine translation of CN217507614U (Year: 2022).*

(Continued)

*Primary Examiner* — Nicolas A Arnett
(74) *Attorney, Agent, or Firm* — ANOVA LAW GROUP, PLLC

(57) ABSTRACT

A liquid injection device comprises a vacuumizing air path, first-level and second-level cups, injection paths, and liquid flowing assemblies. The first-level cup is formed with a plurality of buffer cavities that are isolated from each other; the second-level cup is formed with a plurality of liquid injection cavities that are isolated from each other; the liquid injection cavities are all communicated with the vacuumizing air path; each injection path is communicated with one buffer cavity; the liquid flowing assemblies, the buffer cavities, and the liquid injection cavities are arranged in a one-to-one correspondence manner; each liquid flowing assembly comprises a liquid flowing channel and a first switch element; the liquid flowing channel is communicated with one buffer cavity and one liquid injection cavity; and the first switch element is arranged in the liquid flowing channel to selectively open or close the liquid flowing channel.

18 Claims, 3 Drawing Sheets

(56) References Cited

U.S. PATENT DOCUMENTS

| | | | | | |
|---|---|---|---|---|---|
| 3,561,505 | A | * | 2/1971 | Ryder | H01M 50/673 141/237 |
| 4,010,780 | A | * | 3/1977 | Eberle | H01M 50/627 198/346.2 |
| 4,359,075 | A | * | 11/1982 | Eberle | H01M 50/627 408/46 |
| 5,487,417 | A | * | 1/1996 | Kasahara | H01M 50/673 141/34 |
| 5,731,099 | A | * | 3/1998 | Badger | H01M 50/673 137/260 |
| 6,390,146 | B1 | * | 5/2002 | Tiegel | H01M 50/673 141/59 |
| 8,047,241 | B2 | * | 11/2011 | Reschke | H01M 50/627 137/260 |
| 8,286,676 | B2 | * | 10/2012 | Ianniello | H01M 10/12 137/260 |
| 8,910,671 | B2 | * | 12/2014 | Yamaura | H01M 10/0404 141/8 |
| 9,680,146 | B2 | * | 6/2017 | Wipperfuerth | H01M 50/609 |
| 2014/0023912 | A1 | * | 1/2014 | Ohira | H01M 50/618 429/178 |
| 2015/0162594 | A1 | * | 6/2015 | Watanabe | H01M 50/627 141/32 |
| 2015/0364746 | A1 | * | 12/2015 | Wipperfuerth | H01M 50/609 141/32 |
| 2023/0163437 | A1 | * | 5/2023 | Xiao | H01M 10/04 141/59 |

FOREIGN PATENT DOCUMENTS

| | | |
|---|---|---|
| CN | 210110922 U | 2/2020 |
| CN | 111341996 A | 6/2020 |
| CN | 210956841 U | 7/2020 |
| CN | 215680916 U | 1/2022 |
| CN | 217158588 U | 8/2022 |
| CN | 217507614 U | 9/2022 |
| CN | 219303915 U | 7/2023 |
| WO | 2019103559 A1 | 5/2019 |

OTHER PUBLICATIONS

International Search Report in the international application No. PCT/CN2024/113740, mailed on Nov. 18, 2024, 10 pages with English translation.

Written Opinion of the International Search Authority in the international application No. PCT/CN2024/113740, mailed on Nov. 18, 2024, 10 pages with English translation.

* cited by examiner

LIQUID INJECTION DEVICE AND PRODUCTION LINE

CROSS-REFERENCE TO RELATED APPLICATIONS

This application is a continuation of International Application No. PCT/CN2024/113740, filed on Aug. 21, 2024, which claims priority to Chinese Patent Application No. 202420096151.0 filed on Jan. 15, 2024 and entitled "LIQUID INJECTION DEVICE AND PRODUCTION LINE", which are incorporated herein by reference in their entirety.

TECHNICAL FIELD

The present disclosure relates to the technical field of batteries and in particular to, a liquid injection device and a production line.

BACKGROUND

Batteries are increasingly applied in life and production. For example, new energy vehicles equipped with batteries have been widely used. The batteries can be increasingly configured to supply power entirely or partially to the new energy vehicles. In addition, the batteries are increasingly used in energy storage and other fields.

A battery includes at least one battery cell. In a production process of the battery, an electrolyte solution needs to be injected into an internal cavity of the battery cell through a liquid injection device. In the related art, the liquid injection device includes a liquid injection cup. The liquid injection cup is communicated with the internal cavity of the battery cell. Usually, the liquid injection cup and the internal cavity of the battery cell need to be first vacuumized, and then the electrolyte solution is injected into the liquid injection cup and is injected into the internal cavity of the battery cell through the liquid injection cup. Since a liquid injection operation can only be performed after the vacuumizing operation is completed, the liquid injection time is long, and the production efficiency is low.

SUMMARY

In view of this, embodiments of the present disclosure aim to provide a liquid injection device and a production line, which can shorten the liquid injection time and improve the production efficiency.

In order to achieve the above objective, the technical solutions of the embodiments of the present disclosure are achieved below:

An embodiment of the present disclosure provides a liquid injection device, including:
  a vacuumizing air path;
  a first-level cup, formed with a plurality of buffer cavities that are isolated from each other;
  a second-level cup, formed with a plurality of liquid injection cavities that are isolated from each other, wherein the liquid injection cavities are communicated with the vacuumizing air path;
  a plurality of injection paths, wherein each injection path is communicated with one buffer cavity; and
  a plurality of liquid flowing assemblies, wherein the liquid flowing assemblies, the buffer cavities, and the liquid injection cavities are arranged in a one-to-one correspondence manner; each liquid flowing assembly includes a liquid flowing channel and a first switch element; the liquid flowing channel is communicated with one buffer cavity and one liquid injection cavity; and the first switch element is arranged in the liquid flowing channel to selectively open or close the liquid flowing channel.

According to the liquid injection device provided in this embodiment of the present disclosure, on the one hand, liquid preparation and vacuumizing can be carried out at the same time through the vacuumizing air path, the first-level cup, the second-level cup, the plurality of injection paths, and the plurality of liquid flowing assemblies. In this way, the problem of long liquid injection time caused by first vacuumizing and then liquid injection in the related art is solved, and the production efficiency is improved. On the other hand, the first-stage cup is formed with the plurality of buffer cavities that are isolated from each other, and the second-stage cup is formed with the plurality of liquid injection cavities that are isolated from each other. The plurality of liquid flowing assemblies can be respectively connected to the buffer cavities and the liquid injection cavities in an open or close manner. In this way, one liquid injection device can inject liquid into a plurality of battery cells, which further improves the production efficiency.

In some embodiments, the liquid injection device includes a first-level air path, and the buffer cavities are all communicated with the first-level air path.

In this embodiment, after liquid preparation and vacuumizing are completed, the buffer cavities can be kept at a slightly positive pressure or a normal pressure through the first-level air path, so that the electrolyte solution in the buffer cavities can smoothly enter the liquid injection cavities.

In some embodiments, the first-level air path includes:
  a first-level busbar, formed with a first-level busbar channel and a main air port communicated with the first-level busbar channel, wherein the buffer cavities are communicated with the first-level busbar channel; and
  a main air pipe, communicated with the main air port.

In this embodiment, one first-level busbar channel can be communicated with all the buffer cavities, and pressurization or depressurization on all the buffer cavities can be achieved through one main air pipe and one busbar channel, which not only saves pipelines and reduces costs, but also lowers the difficulty of pipeline laying.

In some embodiments, the first-level busbar is arranged at the top of the first-level cup.

In this embodiment, the height of the first-level busbar bar is greater than the height of each buffer cavity, which can prevent the electrolyte solution in the buffer cavities from entering the first-level busbar channel as far as possible.

In some embodiments, the liquid injection device includes a plurality of second switch elements, and the vacuumizing air path includes:
  a second-level busbar, formed with a second-level busbar channel and a general air port communicated with the second-level busbar channel, wherein the liquid injection cavities are all communicated with the second-level busbar channel; each injection cavity is correspondingly provided with one second switch element; the second switch element is configured to selectively open or close an air flow path between the corresponding liquid injection cavity and the second-level busbar channel; and
  a general air pipe, communicated with the general air port.

In this embodiment, on the one hand, one second switch element is correspondingly arranged at each liquid injection cavity, and the air flow path between each liquid injection cavity and the second-level busbar channel is opened or closed by the second switch element, so as to more accurately control a vacuum degree of each liquid injection cavity, thereby improving the reliability. On the other hand, a second-level busbar channel is communicated with one general air pipe, which can not only save pipelines and reduce costs, but also lowers the difficulty of pipeline laying.

In some embodiments, the second-level busbar is arranged at the top of the second-level cup.

In this embodiment, the height of the second-level busbar bar is greater than the height of each liquid injection cavity, which can prevent the liquid in the liquid injection cavities from entering the second-level busbar channel as far as possible.

In some embodiments, the height of the first-level cup is greater than the height of the second-level cup.

In this embodiment, after liquid preparation and vacuumizing are completed, the electrolyte solution in the buffer cavities can enter the liquid injection cavities under the action of gravity, thereby reducing resistance during the flowing of the electrolyte solution and improving the liquid injection efficiency.

In some embodiments, the liquid injection device includes third switch elements corresponding to the injection paths in a one-to-one manner; and the third switch elements are arranged at the injection paths to selectively open or close the injection paths.

In this embodiment, an amount of the electrolyte solution that enters the buffer cavities can be more accurately controlled by the third switch elements, and the injection paths can be closed by the third switch elements in a case that there is no need to inject the electrolyte solution into the buffer cavities.

In some embodiments, the liquid injection device includes a plurality of fourth switch elements and a plurality of liquid injection nozzles arranged at the second-level cup; each liquid injection cavity is communicated with one liquid injection nozzle, and one fourth switch element is arranged between the liquid injection cavity and the corresponding liquid injection nozzle; and the fourth switch element is configured to selectively open or close a liquid flow path between the liquid injection cavity and the corresponding liquid injection nozzle.

In this embodiment, before the liquid injection cavities are vacuumized, the fourth switch elements can be used to close the liquid flow paths between the liquid injection cavities and the corresponding liquid injection nozzles to facilitate rapid vacuumizing of the liquid injection cavities. In the process that the electrolyte solution in the liquid injection cavities enter the internal cavities of the battery cells, the fourth switch elements open the liquid flow paths between the liquid injection cavities and the corresponding liquid injection nozzles. After the liquid injection is completed, the fourth switch elements can close the liquid flow paths between the liquid injection cavities and the corresponding liquid injection nozzles to prevent external air from entering the liquid injection cavities through the liquid injection nozzles.

An embodiment of the present disclosure further provides a production line, configured to produce a battery and including any one of the foregoing liquid injection device.

DESCRIPTIONS OF REFERENCE NUMERALS

Figure 1:
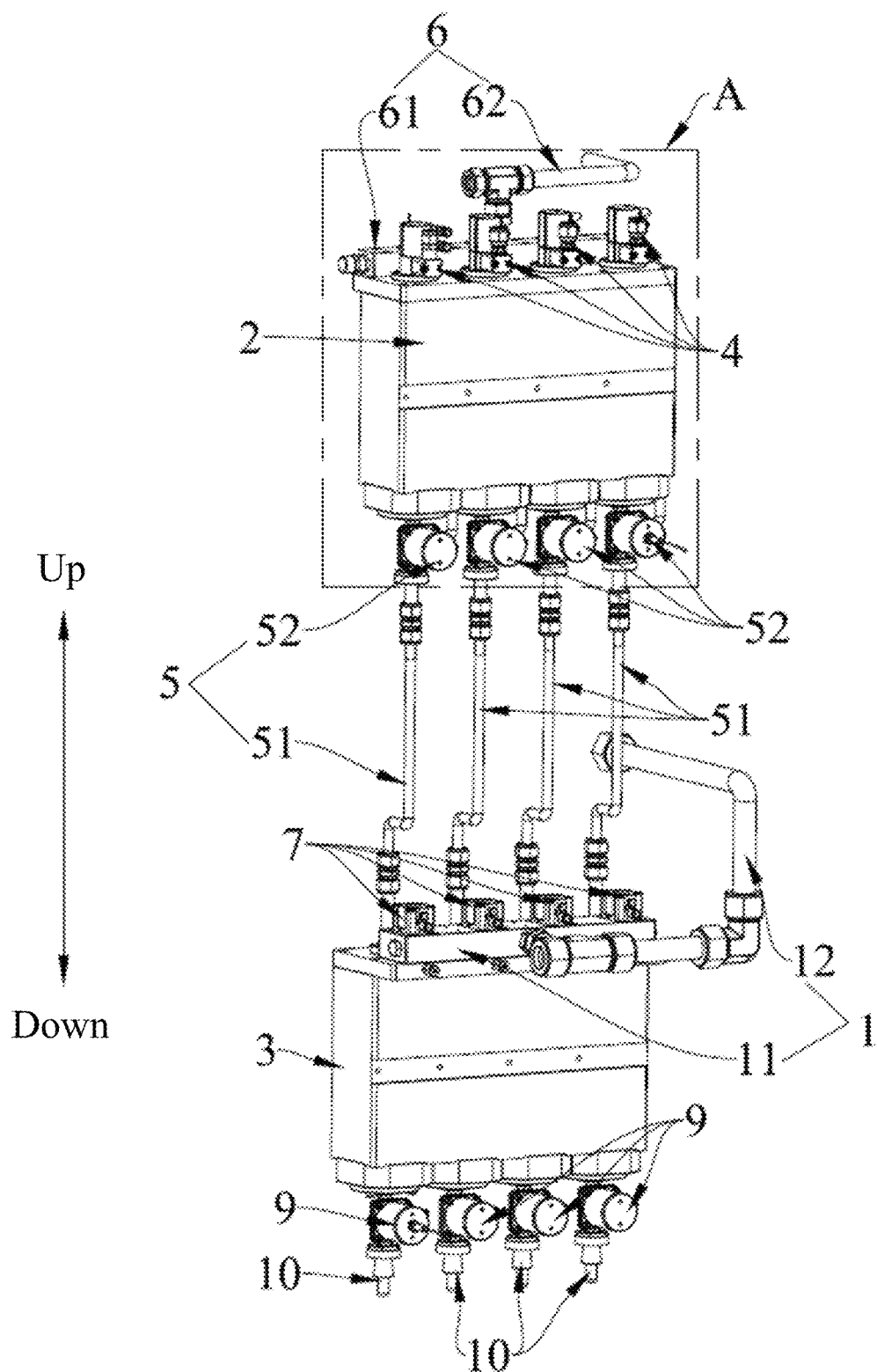
FIG. 1 is a schematic structural diagram of a liquid injection device in an embodiment of the present disclosure.

1: vacuumizing air path; 11: second-level busbar; 12: general air pipe; 2: first-level cup; 3: second-level cup; 4: injection path; 5: liquid flowing assembly; 51: liquid flowing channel; 52: first switch element; 6: first-level air path; 61: first-level busbar; 62: main air pipe; 7: second switch element; 8: third switch element; 9: fourth switch element; and 10: liquid injection nozzle.

DESCRIPTION OF EMBODIMENTS

Examples of the technical solutions of the present disclosure will be described in detail below in conjunction with the drawings. The following embodiments are only configured to more clearly illustrate the technical solutions of the present disclosure, and therefore are only used as examples and cannot be configured to limit the scope of protection of the present disclosure.

Unless otherwise defined, all technical and scientific terms used herein have the same meaning as commonly understood by those skilled in the art of the present disclosure. The terms used herein are intended only for the purpose of describing specific embodiments and are not intended to limit the present disclosure.

In the description of the embodiments of the present disclosure, the technical terms "first", "second", and the like are only for distinguishing different objects, and may not be understood as indicating or implying the relative importance or implicitly indicating the number, specific order or primary and secondary relations of the technical features indicated.

Reference to "an embodiment" herein means that a particular feature, structure or characteristic described in conjunction with an embodiment may be included in at least one embodiment of the present disclosure. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

The liquid injection device and the production line that are provided in the embodiments of the present disclosure are both used for battery production. To facilitate a clear description of the liquid injection device and the production line in the embodiments of the present disclosure, a battery in the embodiments of the present disclosure is first introduced.

A battery in an embodiment of the present disclosure can be independently used. A plurality of batteries can also be grouped together and used as a battery pack. The batteries and the battery pack can be used in, but not limited to, an electrical apparatus. The electrical apparatus includes, but is not limited to, a mobile phone, a tablet, a notebook, an electric toy, an electric tool, a vehicle, a ship, a spacecraft, or the like. The spacecraft can include an airplane, a rocket, a space shuttle, a spaceship, and the like.

The electrical apparatus in an embodiment of the present disclosure being a vehicle is taken for example. The vehicle may be a fuel vehicle, a gas vehicle, or a new energy vehicle, and the new energy vehicle may be a battery electric vehicle, a hybrid electric vehicle, an extended range vehicle, or the like. A battery is arranged inside the vehicle. The battery may be arranged at the bottom of the vehicle or at a head or tail of the vehicle. The battery may be configured to supply power the vehicle. For example, the battery may be used as an operating power source of the vehicle. In some embodiments, the battery not only may serve as the operating power source of the vehicle, but also may serve as a driving power source of the vehicle, thus replacing or partially replacing fuel or natural gas to provide driving power for the vehicle.

The battery cell may be a lithium-ion battery, a sodium lithium-ion battery, a lithium-metal battery, a lithium-sulfur battery, or the like, which will not be limited in the embodiments of the present disclosure.

The battery includes at least one battery cell. The battery cell is an energy storage component of the battery. The battery further includes a battery monitoring and management device for monitoring a battery life of the battery cell.

In the battery, there may be a plurality of battery cells. The plurality of battery cells may be connected in series or in parallel or be in parallel-series connection. The parallel-series connection means that the plurality of battery cells are connected in both series and parallel. The plurality of battery cells may be directly connected in series, in parallel or parallel-series connection. Certainly, the battery may also be in the form of battery modules composed of a plurality of battery cells connected in series or parallel or in parallel-series connection, and then the plurality of battery modules are connected in series or in parallel or in parallel-series connection to form a whole.

In this embodiment of the present disclosure, the battery cell may be a secondary battery cell. The secondary battery cell means that after a battery cell is discharged, an active material can be activated by charging, and the battery cell can be continued to be used.

The battery cell may be a cylindrical battery cell, a prismatic battery cell or a battery cell in other shapes. The prismatic battery cell includes a square shell battery cell or a poly-prismatic battery cell. The poly-prismatic cell is, for example, a hexagonal prismatic cell, and the present disclosure has no particular limitation.

An internal cavity of the battery cell is configured to place an electrode assembly and an electrolyte solution. Exemplarily, the battery cell includes a shell, an electrode assembly, and an electrolyte solution. The shell is formed with the internal cavity, and the electrode assembly and the electrolyte solution are placed in the internal cavity of the shell. The shell is configured to encapsulate components, such as the electrode assembly and the electrolyte solution.

Referring to FIG. 1, an embodiment of the present disclosure provides a liquid injection device. The liquid injection device includes a vacuumizing air path 1, a first-level cup 2, a second-level cup 3, a plurality of injection paths 4, and a plurality of liquid flowing assemblies 5.

The first-level cup 2 is formed with a plurality of buffer cavities that are isolated from each other. Each injection path 4 is communicated with one buffer cavity. The injection path 4 is configured to inject liquid, such as an electrolyte solution, into the buffer cavity that is correspondingly communicated with the injection path. The electrolyte solution in the buffer cavities cannot flow into each other.

The second-level cup 3 is formed with a plurality of liquid injection cavities that are isolated from each other. The liquid injection cavities are communicated with the vacuumizing air path 1. The vacuumizing air path 1 is configured to vacuumize the liquid injection cavities. The electrolyte solution in the liquid injection cavities cannot flow into each other.

Referring to FIG. 1, the liquid flowing assemblies 5, the buffer cavities, and the liquid injection cavities are arranged in a one-to-one correspondence manner. Each liquid flowing assembly 5 includes a liquid flowing channel 51 and a first switch element 52. The liquid flowing channel 51 is communicated with one buffer cavity and one liquid injection cavity. The first switch element 52 is arranged in the liquid flowing channel 51 to selectively open or close the liquid passing channel 51. Namely, one buffer cavity and one liquid injection cavity form a pair. Each liquid flowing assembly 5 corresponds to a pair of buffer cavity and liquid injection cavity, and the liquid flowing channel 51 is communicated with a pair of buffer cavity and liquid injection cavity.

Exemplarily, in a case that liquid needs to be injected into a battery cell, the liquid injection cavities are communicated with the internal cavity of the battery cell, and the first switch elements 52 are in a state of closing the liquid flowing channels 51, so that air and liquid cannot flow between the liquid injection cavities and the buffer cavities. The liquid injection cavities and the internal cavity of the battery cell can be vacuumized through the vacuumizing air path 1. Meanwhile, the electrolyte solution is injected into the buffer cavities through the injection paths 4, so that liquid preparation and vacuumizing are carried out simultaneously. After the liquid preparation and the vacuumizing are completed, a liquid injection step is executed. The liquid injection step includes: The first switch elements 52 are switched to a state of opening the liquid flowing channels 51, and the prepared electrolyte solution in the buffer cavities can enter the liquid injection cavities through the liquid flowing channels 51, and then enter the internal cavity of the battery cell through the liquid injection cavities, to complete the liquid injection.

It can be understood that each liquid injection cavity is communicated with the internal cavity of one battery cell. Therefore, the plurality of liquid injection cavities can be used to inject liquid into a plurality of battery cells. The plurality of battery cells can be simultaneously or separately injected according to a need.

According to the liquid injection device provided in this embodiment of the present disclosure, on the one hand, liquid preparation and vacuumizing can be carried out at the same time through the vacuumizing air path 1, the first-level cup 2, the second-level cup 3, the plurality of injection paths 4, and the plurality of liquid flowing assemblies 5. In this way, the problem of long liquid injection time caused by first vacuumizing and then liquid injection in the related art is solved; the liquid injection time can be shortened; and the production efficiency is improved. On the other hand, the first-stage cup 2 is formed with the plurality of buffer cavities that are isolated from each other, and the second-stage cup 3 is formed with the plurality of liquid injection cavities that are isolated from each other. The plurality of liquid flowing assemblies 5 can be respectively connected to the buffer cavities and the liquid injection cavities in an open or close manner. In this way, one liquid injection device can inject liquid into a plurality of battery cells, which further improves the production efficiency.

A type of each liquid flowing channel 51 is not limited. Exemplarily, the liquid flowing channel 51 may be formed by a pipeline.

Each first switch element 52 may be an electric control valve. Exemplarily, the first switch element 52 includes, but is not limited to, a membrane plug valve. In this way, it is convenient to control opening and closing of each first switch element 52 through a control circuit, thereby controlling opening and closing of each liquid flowing channel 51, so that the automation degree is high.

In some embodiments, referring to FIG. 1, the liquid injection device includes a first-level air path 6, and the buffer cavities are all communicated with the first-level air path 6. The first-level air path 6 is configured to adjust air pressures in the buffer cavities. Exemplarily, the first-level air path 6 can be configured to pressurize or depressurize the buffer cavities.

In this embodiment, after liquid preparation and vacuumizing are completed, the buffer cavities can be kept at a slightly positive pressure or a normal pressure through the first-level air path 6, so that the electrolyte solution in the buffer cavities can smoothly enter the liquid injection cavities.

Figure 2:
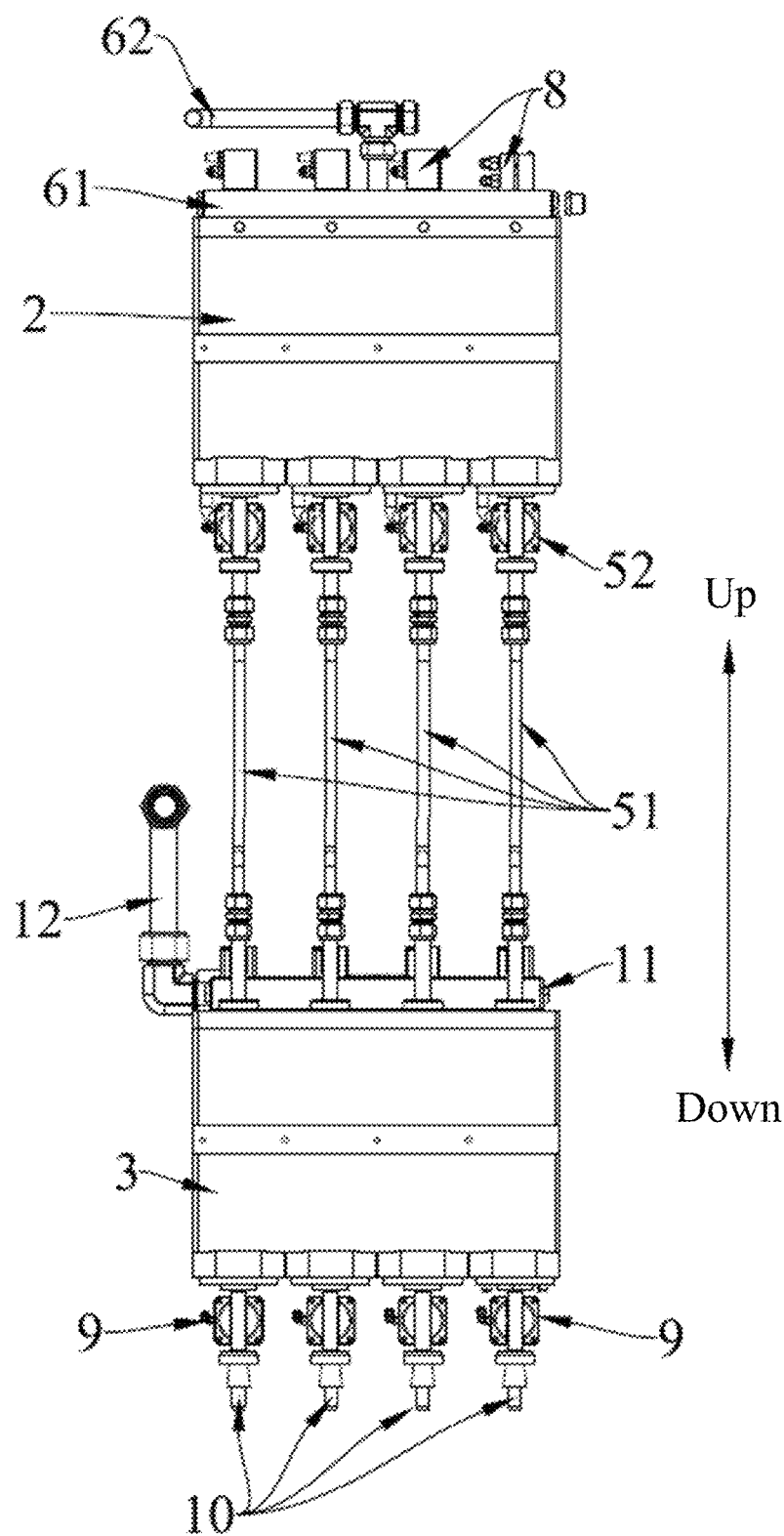
FIG. 2 is a schematic structural diagram of the structure shown in FIG. 1, viewed in another angle.
Figure 3:
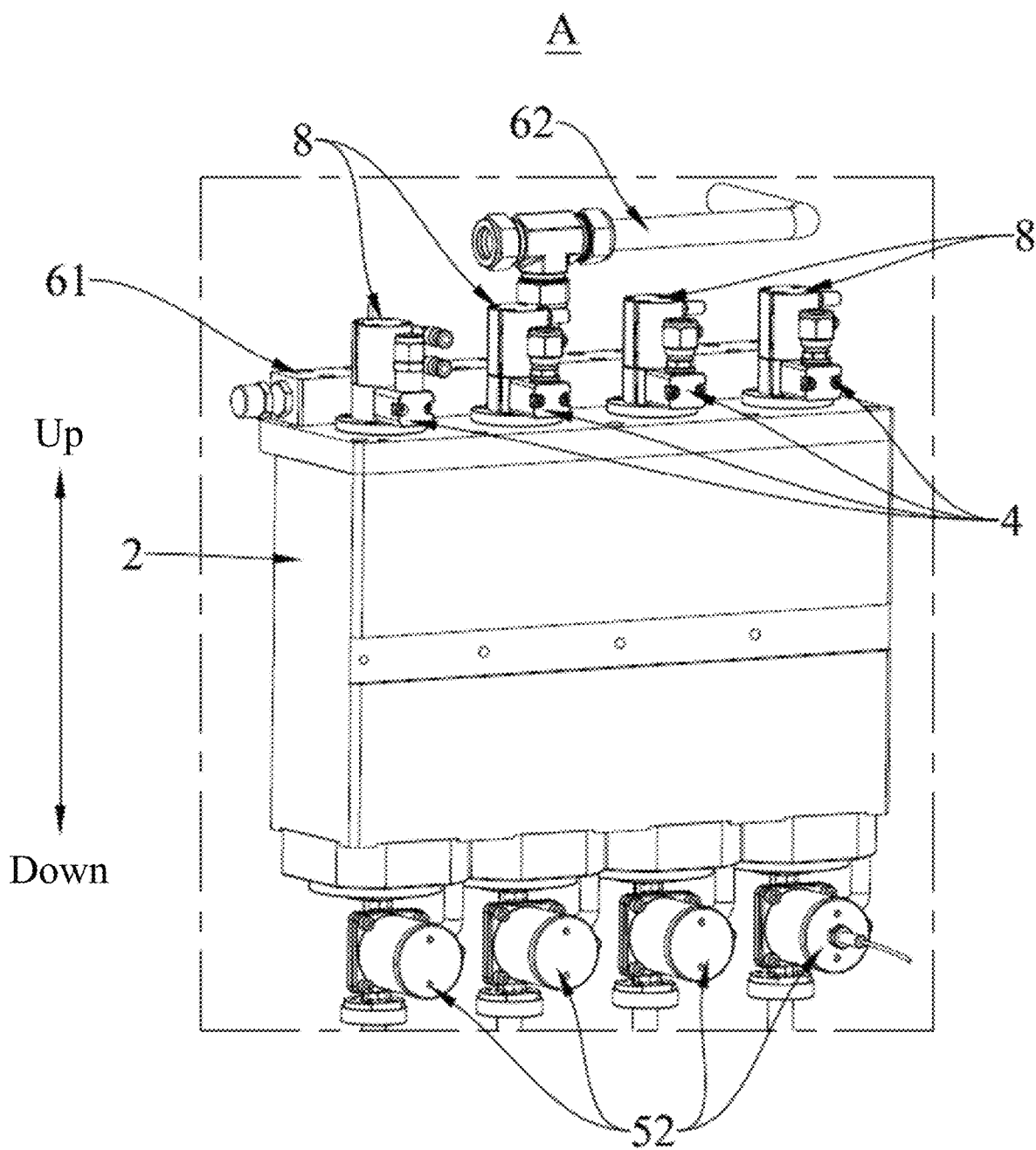
FIG. 3 is a partially enlarged diagram of part A in FIG. 1.

In an embodiment, referring to FIG. 1 to FIG. 3, the first-level air path 6 includes a first-level busbar 61 and a main air pipe 62. The first-level busbar 61 is formed with a first-level busbar channel and a main air port communicated with the first-level busbar channel. The buffer cavities are all communicated with the first-level busbar channel. The main air pipe 62 is communicated with the main air port.

In this embodiment, one first-level busbar channel can be communicated with all the buffer cavities, and pressurization or depressurization on all the buffer cavities can be achieved through one main air pipe 62 and one busbar channel, which not only saves pipelines and reduces costs, but also lowers the difficulty of pipeline laying.

Exemplarily, in an embodiment, the liquid injection device includes an air pump and a fifth switch element. The air pump is connected to the main air pipe 62. The fifth switch element is arranged in the main air pipe 62 to selectively open or close an air path in the main air pipe 62. One air pump can supply air to the plurality of buffer cavities through the main air pipe 62 and the first-level busbar 61.

In an embodiment, referring to FIG. 1 to FIG. 3, the first-level busbar bar 61 is arranged at the top of the first-level cup 2. Specifically, a plurality of vents are formed in the top of the first-stage cup 2. Each vent is communicated with one buffer cavity, and the first-stage busbar channel is communicated with the vent. the height of the first-level busbar bar 61 is greater than the height of each buffer cavity, which can prevent the electrolyte solution in the buffer cavities from entering the first-level busbar channel as far as possible.

In an embodiment, referring to FIG. 1, the liquid injection device includes a plurality of second switch elements 7. The vacuumizing air path 1 includes a second-level busbar 11 and a general air pipe 12.

The second-level busbar 11 is formed with a second-level busbar channel and a general air port communicated with the second-level busbar channel. The liquid injection cavities are all communicated with the second-level busbar channel. Each injection cavity is correspondingly provided with one second switch element 7. The second switch element 7 is configured to selectively open or close an air flow path between the corresponding liquid injection cavity and the second-level busbar channel. The general air pipe 12 is communicated with the general air port. In this embodiment, on the one hand, one second switch element 7 is correspondingly arranged at each liquid injection cavity, and the air flow path between each liquid injection cavity and the second-level busbar channel is opened or closed by the second switch element 7, so as to more accurately control a vacuum degree of each liquid injection cavity, thereby improving the reliability. On the other hand, a second-level busbar channel is communicated with one general air pipe 12, which can not only save pipelines and reduce costs, but also lowers the difficulty of pipeline laying.

Each second switch element 7 may be an electric control valve. Exemplarily, the second switch element 7 includes, but is not limited to, a piston valve. In this way, it is convenient to control opening and closing of each second switch element 7 through a control circuit, so that the automation degree is high.

Exemplarily, in an embodiment, the liquid injection device includes a vacuum air source. The vacuum air source is connected to the general air pipe 12. One vacuum air source can vacuumize the plurality of liquid injection cavities through the general air pipe 12 and the second-level busbar 11.

The vacuum air source includes, but is not limited to, a vacuum pump.

In an embodiment, referring to FIG. 1 and FIG. 2, the second-level busbar bar 11 is arranged at the top of the second-level cup 3. Specifically, an air inlet communicated with the liquid injection cavities is formed in the top of the second-level cup 3, and the second-level busbar channel is communicated with the air inlet. In this way, the height of the second-level busbar bar 11 is greater than the height of each liquid injection cavity, which can prevent the liquid in the liquid injection cavities from entering the second-level busbar channel as far as possible.

In an embodiment, referring to FIG. 1 and FIG. 2, the height of the first-level cup 2 is greater than the height of the second-level cup 3. Exemplarily, the first-level cup 2 may be located above the second-level cup 3. After liquid preparation and vacuumizing are completed, the electrolyte solution in the buffer cavities can enter the liquid injection cavities under the action of gravity, thereby reducing resistance during the flowing of the electrolyte solution and improving the liquid injection efficiency.

It should be noted that down is a direction towards the ground, and up is a direction opposite to down. Top is in the same direction as up, and bottom is in the same direction as down.

In an embodiment, referring to FIG. 1 to FIG. 3, the liquid injection device includes third switch elements 8 corresponding to the injection paths 4 in a one-to-one manner; and the third switch elements 8 are arranged at the injection paths 4 to selectively open or close the injection paths 4. In this way, an amount of the electrolyte solution that enters the buffer cavities can be more accurately controlled by the third switch elements 8, and the injection paths 4 can be closed by the third switch elements 8 in a case that there is no need to inject the electrolyte solution into the buffer cavities.

Each third switch element 8 may be an electric control valve. Exemplarily, the third switch element 8 includes, but is not limited to, a membrane plug valve. In this way, it is convenient to control opening and closing of each third switch element 8 through a control circuit, so that the automation degree is high.

In an embodiment, the liquid injection device includes an electrolyte solution pump, and the electrolyte solution pump is connected to the injection paths 4 to pump the electrolyte solution. In an embodiment, referring to FIG. 1 and FIG. 2, the liquid injection device includes a plurality of fourth switch elements 9 and a plurality of liquid injection nozzles 10 arranged at the second-level cup 3. Each liquid injection cavity is communicated with one liquid injection nozzle 10, and one fourth switch element 9 is arranged between the liquid injection cavity and the corresponding liquid injection nozzle 10. The fourth switch element 9 is configured to selectively open or close a liquid flow path between the liquid injection cavity and the corresponding liquid injection nozzle 10.

Each liquid injection nozzle 10 is configured to be hermetically connected to a liquid injection port of each battery cell, and the electrolyte solution in the liquid injection cavity can enter the internal cavity of the battery cell through the liquid injection nozzle 10 and the liquid injection port.

In this embodiment, before the liquid injection cavities are vacuumized, the fourth switch elements 9 can be used to close the liquid flow paths between the liquid injection cavities and the corresponding liquid injection nozzles 10 to facilitate rapid vacuumizing of the liquid injection cavities. In the process that the electrolyte solution in the liquid injection cavities enter the internal cavities of the battery cells, the fourth switch elements 9 open the liquid flow paths between the liquid injection cavities and the corresponding liquid injection nozzles 10. After the liquid injection is completed, the fourth switch elements 9 can close the liquid flow paths between the liquid injection cavities and the corresponding liquid injection nozzles 10 to prevent external air from entering the liquid injection cavities through the liquid injection nozzles 10.

Each fourth switch element 9 may be an electric control valve. Exemplarily, the fourth switch element 9 includes, but is not limited to, a membrane plug valve. In this way, it is convenient to control opening and closing of each fourth switch element 9 through a control circuit, so that the automation degree is high.

In an embodiment, referring to FIG. 1 and FIG. 2, the liquid injection nozzles 10 are located at the bottom of the second-level cup 3. In this way, it is convenient for the electrolyte solution to flow under the gravity, thus reducing the flowing resistance.

In a specific embodiment, referring to FIG. 1 to FIG. 3, the liquid injection device includes a vacuumizing air path 1, a first-level air path 6, a first-level cup 2, a second-level cup 3, a plurality of injection paths 4, a plurality of liquid flowing assemblies 5, a plurality of second switch elements 7, third switch elements 8, a plurality of fourth switch elements 9, a plurality of liquid injection nozzles 10, and a fifth switch element.

In a case that there is no need to inject liquid into internal cavities of battery cells, the first switch elements 52, the second switch elements 7, the third switch elements 8, the fourth switch elements 9, and the fifth switch element can all be in closed states. Namely, the vacuumizing air path 1, the first-level air path 6, the injection paths 4, the liquid flowing channels 51, and the liquid injection nozzles 10 are all in off states, and air and liquid cannot enter or leave the buffer cavities and the liquid injection cavities.

In a case that liquid needs to be injected into the internal cavities of the battery cells, liquid injection ports of the battery cells are hermetically connected to the liquid injection nozzles 10. Firstly, liquid preparation and vacuumizing steps are executed, specifically including: The second switch elements 7 are opened to open the vacuumizing air path 1, and a vacuum air source is turned on to vacuumize the liquid injection cavities and the internal cavities of the battery cells. Meanwhile, the third switch elements 8 are opened to open the injection paths 4. An electrolyte solution pump works to pump an electrolyte solution into the buffer cavities. In this way, liquid preparation and vacuumizing can be carried out simultaneously. After the liquid preparation and the vacuumizing are completed, a liquid injection step is then executed, specifically including: The second switch elements 7 are closed to close the vacuumizing air path 1. The first-level air path 6 supplies air to the buffer cavities, so that the buffer cavities are switched to a normal pressure. The first switch elements 52 are opened to open the liquid flowing channels 51, and the fourth switch elements 9 are opened to open liquid flowing paths between the liquid injection cavities and the corresponding liquid injection nozzles 10. The electrolyte solution in the buffer cavities flows through the liquid flowing channels 51, the liquid injection cavities, and the liquid injection nozzles 10 in sequence, and finally enters the internal cavities of the battery cells. In this way, the liquid injection on the battery cells is completed.

An embodiment of the present disclosure further provides a production line. The production line includes the liquid injection device in any one of the embodiments of the present disclosure.

The liquid injection cavities are configured to be communicated with internal cavities of battery cells, so as to inject an electrolyte solution into the internal cavities of the battery cells. For example, the liquid injection cavities can be communicated with liquid injection ports of the battery cells through the liquid injection nozzles 10, to inject the electrolyte solution into the internal cavities of the battery cells.

The foregoing embodiments are merely intended to describe the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to partial or all technical features thereof. However, these modifications or replacements do not make the essence of the corresponding technical solutions depart from the scope of the technical solutions of the embodiments of the present disclosure. Particularly, the technical features mentioned in the embodiments may be combined in any manner provided that there is no structural conflict.

What is claimed is:

1. A liquid injection device, comprising:
   a vacuumizing air path;
   a first-level air path;
   a first-level cup, formed with a plurality of buffer cavities that are isolated from each other, and a plurality of vents in a top of the first-level cup, each of the plurality of vents being communicated with one of the plurality of buffer cavities, and the plurality of vents being all communicated with the first-level air path;
   a second-level cup, formed with a plurality of liquid injection cavities that are isolated from each other, wherein the plurality of liquid injection cavities are communicated with the vacuumizing air path;
   a plurality of injection paths, wherein each injection path is communicated with one buffer cavity; and
   a plurality of liquid flowing assemblies, wherein the plurality of liquid flowing assemblies, the plurality of buffer cavities, and the plurality of liquid injection cavities are arranged in a one-to-one correspondence manner; each liquid flowing assembly comprises a liquid flowing channel and a first switch element; the liquid flowing channel is communicated with one buffer cavity and one liquid injection cavity; and the first switch element is arranged in the liquid flowing channel to selectively open or close the liquid flowing channel.

2. The liquid injection device according to claim 1, wherein the first-level air path comprises:
   a first-level busbar, formed with a first-level busbar channel and a main air port communicated with the first-level busbar channel, wherein the buffer cavities are all communicated with the first-level busbar channel; and
a main air pipe, communicated with the main air port.

3. The liquid injection device according to claim 2, wherein the first-level busbar is arranged at the top of the first-level cup.

4. The liquid injection device according to claim 2, further comprising:
an air pump and a fifth switch element;
wherein:
the air pump is connected to the main air pipe; and
the fifth switch element is arranged in the main air pipe to selectively open or close an air path in the main air pipe.

5. The liquid injection device according to claim 1, further comprising:
a plurality of second switch elements, wherein:
the vacuumizing air path comprises a second-level busbar, formed with a second-level busbar channel and a general air port communicated with the second-level busbar channel;
the liquid injection cavities are all communicated with the second-level busbar channel;
each injection cavity is correspondingly provided with one second switch element; and
the second switch element is configured to selectively open or close an air flow path between the corresponding liquid injection cavity and the second-level busbar channel; and
a general air pipe, communicated with the general air port.

6. The liquid injection device according to claim 5, wherein each second switch element is an electric control valve.

7. The liquid injection device according to claim 5, further comprising:
a vacuum air source, connected to the general air pipe.

8. The liquid injection device according to claim 5, wherein the second-level busbar is arranged at the top of the second-level cup.

9. The liquid injection device according to claim 1, wherein the height of the first-level cup is greater than the height of the second-level cup.

10. The liquid injection device according to claim 1, further comprising:
third switch elements corresponding to the injection paths in a one-to-one manner, wherein the third switch elements are arranged at the injection paths to selectively open or close the injection paths.

11. The liquid injection device according to claim 10, wherein each third switch element is an electric control valve.

12. The liquid injection device according to claim 1, further comprising:
a plurality of fourth switch elements and a plurality of liquid injection nozzles arranged at the second-level cup;
wherein:
each liquid injection cavity is communicated with one liquid injection nozzle, and one fourth switch element is arranged between the liquid injection cavity and the corresponding liquid injection nozzle; and
the fourth switch element is configured to selectively open or close a liquid flow path between the liquid injection cavity and the corresponding liquid injection nozzle.

13. The liquid injection device according to claim 12, wherein each fourth switch element is an electric control valve.

14. The liquid injection device according to claim 12, wherein the liquid injection nozzles are located at the bottom of the second-level cup.

15. The liquid injection device according to claim 1, wherein each first switch element is an electric control valve.

16. The liquid injection device according to claim 1, further comprising:
an electrolyte solution pump, the electrolyte solution pump being connected to the injection paths to pump the electrolyte solution.

17. A production line, configured to produce a battery and comprising the liquid injection device according to claim 1.

18. A liquid injection device, comprising:
a vacuumizing air path;
a first-level cup, formed with a plurality of buffer cavities that are isolated from each other;
a second-level cup, formed with a plurality of liquid injection cavities that are isolated from each other, wherein the plurality of liquid injection cavities are communicated with the vacuumizing air path;
a plurality of injection paths, wherein each injection path is communicated with one buffer cavity;
a plurality of liquid flowing assemblies, wherein the plurality of liquid flowing assemblies, the plurality of buffer cavities, and the plurality of liquid injection cavities are arranged in a one-to-one correspondence manner; each liquid flowing assembly comprises a liquid flowing channel and a first switch element; the liquid flowing channel is communicated with one buffer cavity and one liquid injection cavity; and the first switch element is arranged in the liquid flowing channel to selectively open or close the liquid flowing channel; and
a plurality of second switch elements and a plurality of liquid injection nozzles, wherein the plurality of second switch elements and the plurality of liquid injection nozzles are arranged at the second-level cup, each of the plurality of liquid injection cavities is communicated with one of the plurality of liquid injection nozzles, one of the plurality of second switch elements is arranged between each of the plurality of liquid injection cavities and the one of the plurality of liquid injection nozzles, and is arranged under the each of the plurality of liquid injection cavities in a vertical direction.

* * * * *